May 18, 1954
H. R. MADDOCKS
2,678,599
APPARATUS FOR USE IN CONTINUOUS PRODUCTION
OF FRENCH FRIED FOOD PRODUCTS
Filed Aug. 4, 1948
4 Sheets-Sheet 1
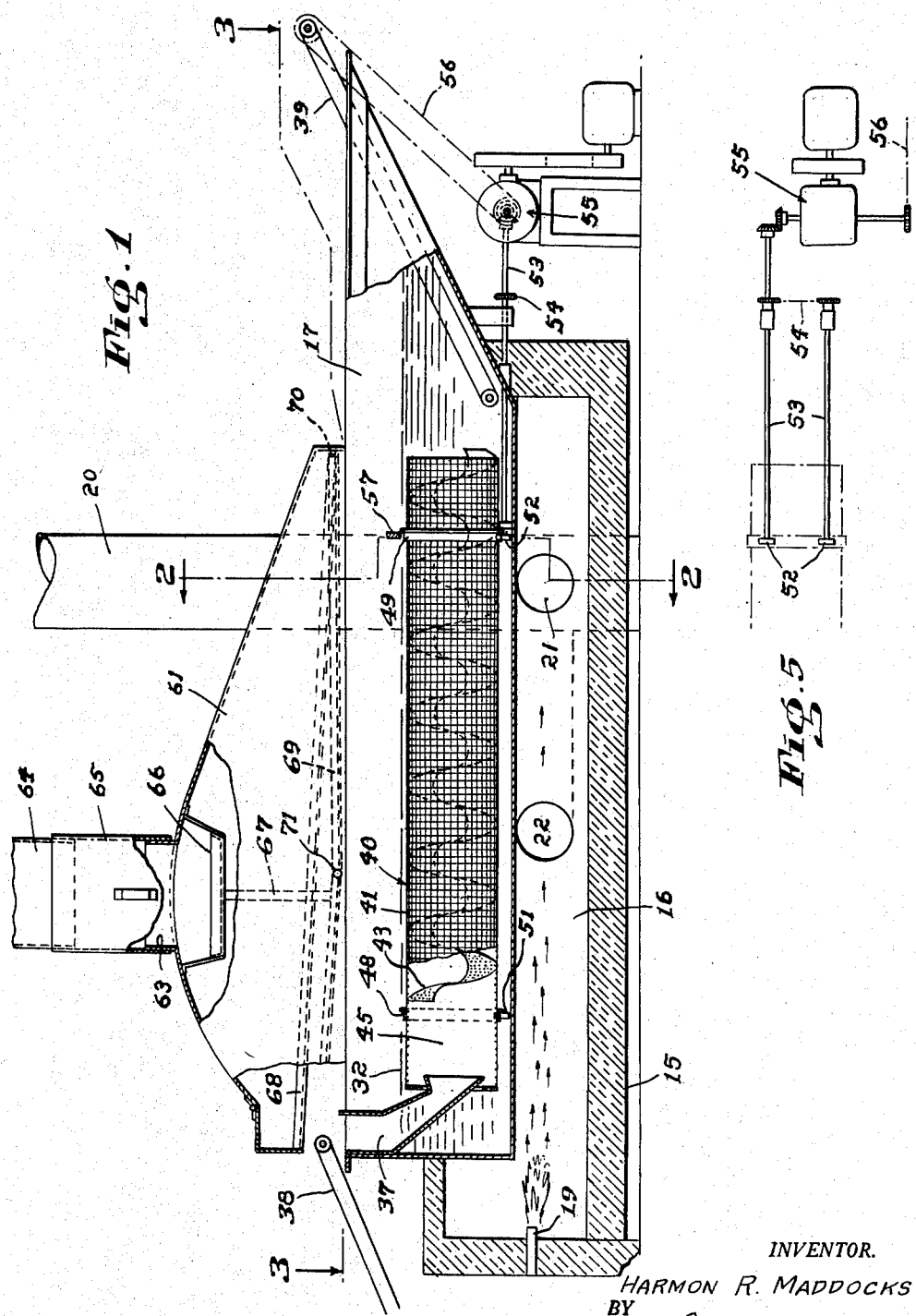
INVENTOR.
HARMON R. MADDOCKS
BY
*Spears+Spear*
ATTORNEYS

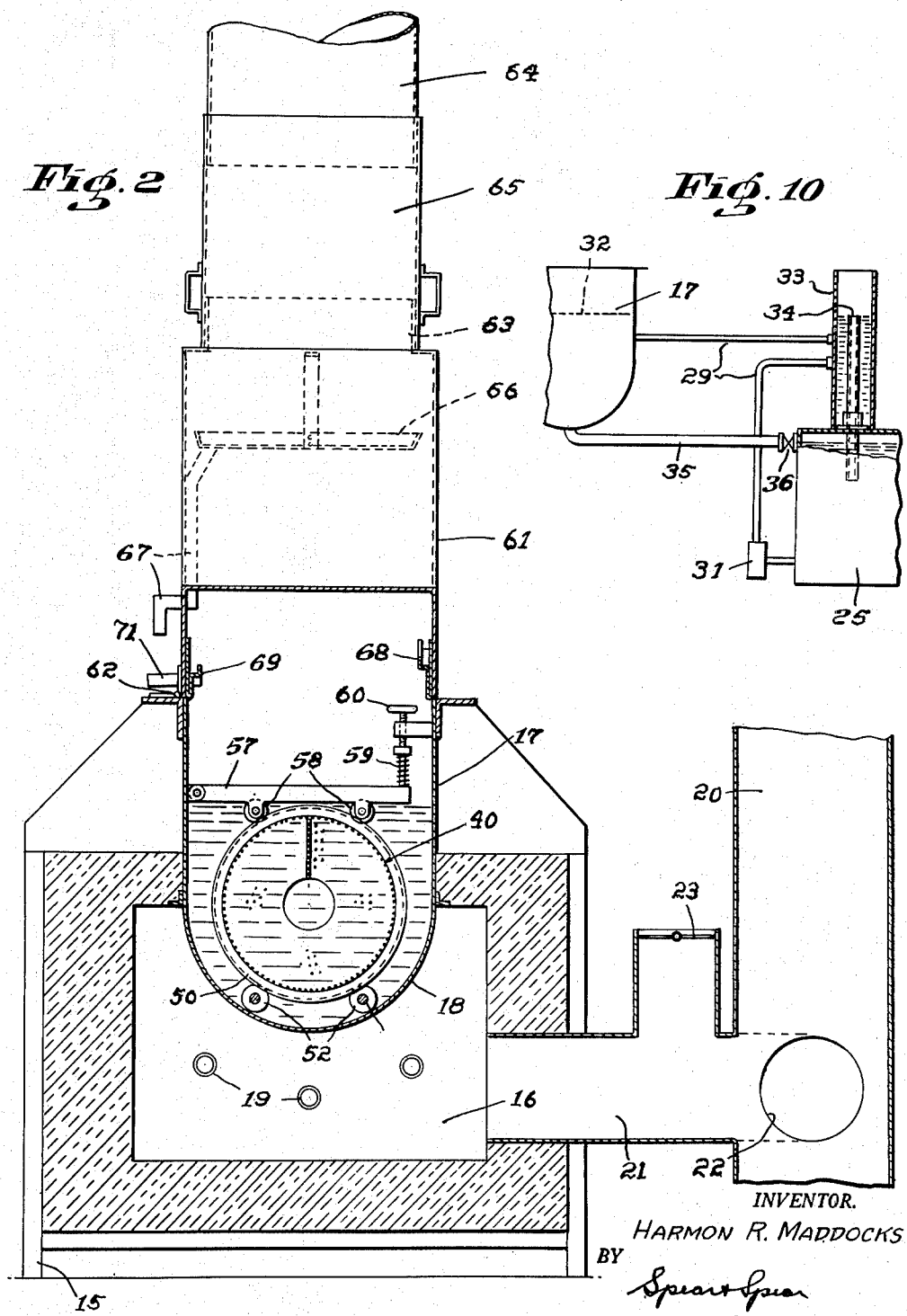

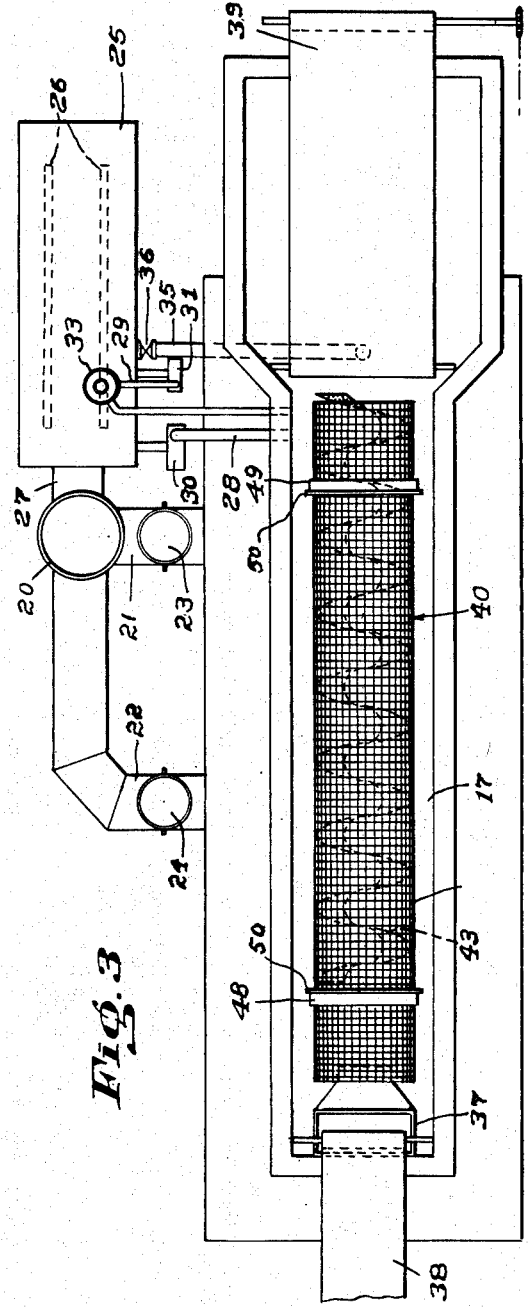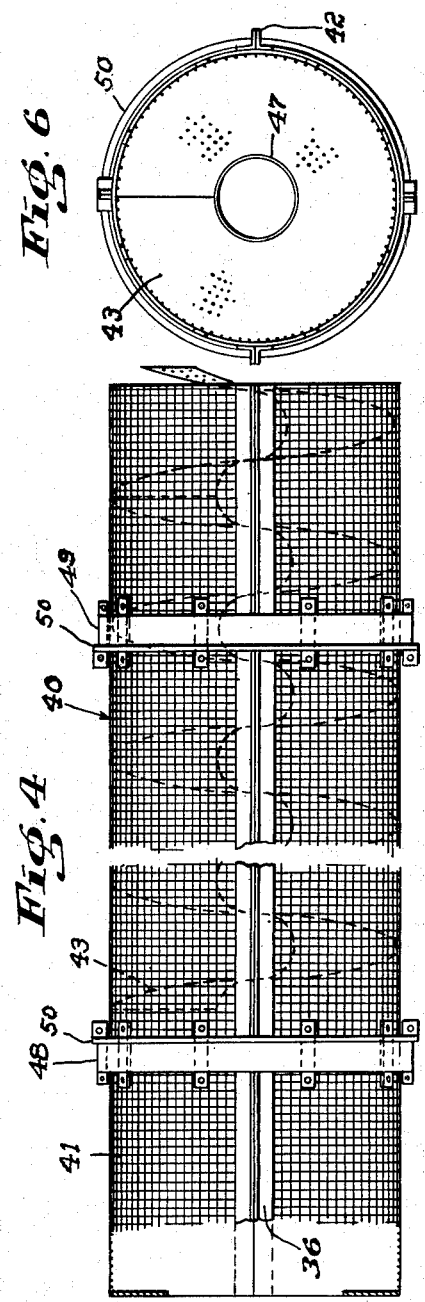

May 18, 1954  H. R. MADDOCKS  2,678,599
APPARATUS FOR USE IN CONTINUOUS PRODUCTION
OF FRENCH FRIED FOOD PRODUCTS
Filed Aug. 4, 1948  4 Sheets-Sheet 4
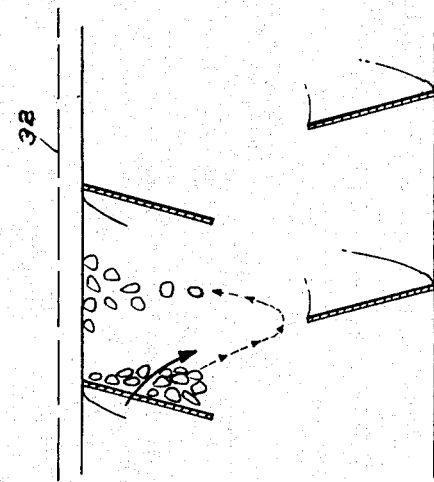
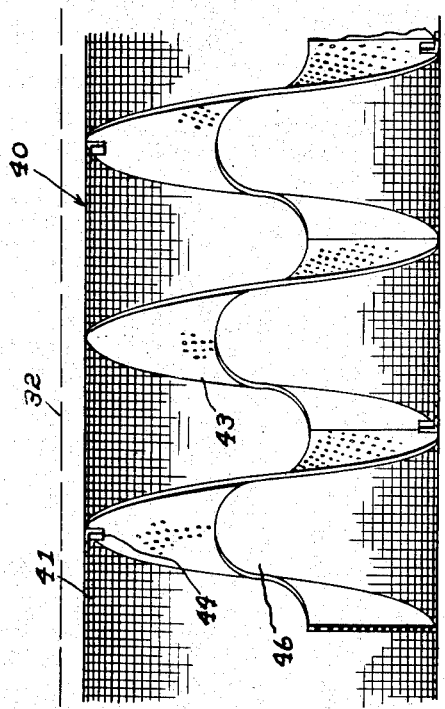
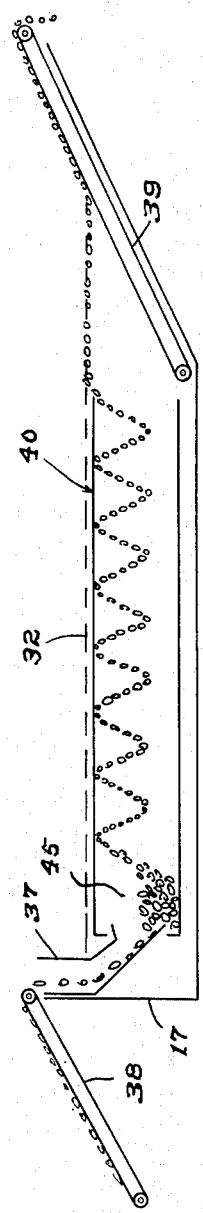
INVENTOR.
HARMON R. MADDOCKS
BY
*Spiro & Spiro*
ATTORNEYS Patented May 18, 1954

2,678,599

UNITED STATES PATENT OFFICE 2,678,599

APPARATUS FOR USE IN CONTINUOUS PRODUCTION OF FRENCH FRIED FOOD PRODUCTS

Harmon R. Maddocks, Boothbay Harbor, Maine, assignor to Maddocks Potato Products Inc., Boothbay Harbor, Maine, a corporation of Delaware Application August 4, 1948, Serial No. 42,374

3 Claims. (Cl. 99—405)

My present invention relates to apparatus for use in the continuous production of French fried potatoes of various types or of other food products.

In the production of such products, the procedure, after they have been prepared for cooking, is to feed the products into a frying kettle and to convey them through the hot fat therein so that they will be suitably cooked by the time they are discharged from the kettle. This procedure is attended by critical problems which interfere seriously with the production of satisfactory French fried products on an economical and efficient basis.

While my invention is adapted for use in cooking all foods that are to be French fried and in the treatment of products generally in liquids, the problems with which it is concerned and its novel features and advantages may best be understood in connection with the production of any of the several types of French fried potatoes not only because such production involves very substantial volume, but also because the sugar and water content of raw potatoes varies with their age and origin introducing variable conditions that must be met if potato products are to be satisfactorily cooked.

All food products that are to be cooked by being French fried sink to the bottom of the hot fat when placed in the frying kettle and remain there until sufficiently dehydrated to float and such dehydration continues substantially throughout the cooking operation. While the floating products move readily from a hot to a cooler zone, that fact cannot be relied upon to control their passage from one end of the kettle to the other to ensure that they will be properly and uniformly cooked when discharged from the kettle, but is preferably utilized in conjunction with means to convey the products therethrough.

There are numerous factors that determine the proper cooking of French fried products such as the color of the product, but the most important one is the necessity of avoiding the absorption of an excessive amount of fat which not only affects the quality of the cooked product adversely, but also represents objectionable expense to the producer. The amount of fat absorbed by the products depends largely on the time of their exposure to it required to cook them properly.

The problems have been known for a long time and various attempts have been made to minimize them and particular attention has been directed towards efforts to provide suitable means to convey the products through the frying kettle. It was soon recognized that particles floating in the hot fat could not be properly cooked since it is only that portion of each product that is actually in the hot fat that is cooked and suitably colored while the exposed portions are not hot enough to cook and function as a wick to absorb fat. To overcome this condition, it was proposed to submerge the particles in the hot fat. Where this was done intermittently to advance floating particles, positive control of their advancement was lost without being able to attain uniformity of results. Where the conveying means positively advanced the submerged products at all times, their tendency then to agglomerate defeated the objective. Inherent in all proposals was the objection that, since uniformity of results could not be attained, the length of time directed to cooking was excessive with a consequent high percentage of fat absorption resulting.

In accordance with my invention, I French fry various food products by establishing a path for them through the hot fat and below its surface. Such a path is of substatial cross sectional area and I advance the products positively along that path by subjecting them to a helical thrust to carry the products, after they have become sufficiently dehydrated to float into the upper part of the path, downwardly and forwardly, along the path. The products are intermittently freed from the helical thrust so that they float into the upper part of it. By this method, the particles are thoroughly and uniformly exposed to the fat and, as a consequence, cooked in a minimum length of time, since they are at all times contained below the surface thereof and are prevented from agglomerating because they are intermittently freed from the helical thrust and, when thus freed, tend to separate in which they are materially assisted by their continuing dehydration. At the same time, their advance along that path is positive.

In practice, the rate of travel of the products along their established path must be related to the nature of the raw stock and to their size and condition. For example, a change from potato chips to so-called potato sticks requires an increase in the cooking time and a change in the raw stock from one source to another may require that the cooking time be further varied. It is necessary, therefore, that the means employed to advance the products positively along their path not only be adapted to meet such requirements, but also to prevent their too rapid travel where a temperature differential between the end zones of the hot fat is utilized or where, for any other cause, the products might move too rapidly unless restrained.

To carry out that method, I provide apparatus consisting of a frying kettle for the hot fat having means, at its rear or infeed end, to introduce raw prepared products into it and, at its front or outfeed end, means to elevate and discharge the cooked particles from the kettle for such other operations as may be desired. Rotatably mounted in the kettle and below the surface of the body of hot fat are my conveying means which are adapted to advance the products from the infeed end to the outfeed end thereof. I accomplish this by means of a rotatable helix housed in a perforate cylinder with the helix being so formed that, as it rotates, the products floating in the upper part of the cylinder are thrust forwardly and downwardly and periodically free themselves from its turns and float upwardly to be again engaged thereby while being confined between its turns. The helix is preferably attached to the cylinder and terminates short of its infeed end to establish a chamber for the products when introduced into the kettle and from which they move into the helix only when they are sufficiently dehydrated to float.

In the accompanying drawings, I have shown an illustrative embodiment of my invention adapted for use in French frying food products from which these and other of its novel features and advantages will be readily apparent.

In the drawings:

Fig. 1 is a partly sectioned and somewhat schematic view of apparatus in accordance with my invention.

Fig. 2 is a section, on an enlarged scale, along the lines 2—2 of Fig. 1.

Fig. 3 is a section along the lines 3—3 of Fig. 1.

Fig. 4 is an enlarged view, in elevation, of the conveyor means.

Fig. 5 is a schematic view of the drive for the conveyor means.

Fig. 6 is an end view of a modified form of conveyor means.

Fig. 7 is a fragmentary longitudinal section through the conveyor means.

Fig. 8 is a diagrammatic view indicating the action of the conveyor means on the products.

Fig. 9 is a like view showing the course of products through my apparatus, and

Fig. 10 is a view of the control maintaining the desired level in the kettle during its use.

In the embodiment of my invention shown in the drawings, my apparatus consists of a base 15 having a refractory lined combustion chamber 16 and supporting the frying kettle 17. The kettle 17 has its lower part 18 of semi-circular cross section and is supported with that portion wholly exposed to the hot gases in the combustion chamber 16. As illustrative of heating means, I have indicated burners at 19 and these are preferably three in number and are mounted in the rear end wall of the chamber 16 arcuately with reference to the periphery of the kettle lower part 18 in spaced relation thereto and to each other. As will be apparent from Fig. 1, the burners 19 are so disposed relative to the kettle that the adjacent or infeed end of the kettle is the zone of highest fat temperature and that impingement of flame against the kettle is avoided. As a consequence, the combustion chamber 16 may be regarded as an oven.

I provide an exhaust stack 20 which is connected to the combustion chamber 16 by flues 21 and 22 controlled by dampers 23 and 24, respectively. The flue 21 is adjacent the front or outfeed end of the apparatus while the flue 22 is spaced from it towards the infeed end of the kettle. By this agreement I am able to maintain a temperature differential in the body of hot fat between its infeed and outfeed zones. For example, with the damper 24 closed, most of the hot gas passes through the flue 21 heating the fat in the outfeed end of the kettle to a maximum extent while, with the damper 23 closed and the damper 24 open, most of the hot gas passes through the flue 22 thereby to minimize the extent to which the hot fat in the outfeed end of the kettle 17 is heated. Such dampers may be automatically operated by any conventional thermally responsive controls to enable a desired differential between the end zones of the hot fat to be established and maintained when the apparatus is in use.

At 25, I have indicated a storage tank for the hot fat which is heated by any suitable means indicated at 26 and having a flue 27 connected to the stack 20. The heating means 26 is adapted to liquefy fat stored in the tank 25 so that it may be pumped into the kettle 17 when the apparatus is to be used. As illustrative of means to transfer the liquid fat from the storage tank 25 to the kettle 17, I have shown conduits 28 and 29 controlled by pumps 30 and 31, respectively. The pump controlled conduit 28 is of larger capacity than the pump controlled conduit 29 and is used in filling the kettle 17 while the latter conduit is employed to maintain the desired hot fat level in the kettle 17 during production runs. The desired hot fat level in the kettle 17 is indicated at 32 and is maintained as by a stand pipe 33 in the conduit 29. See Fig. 10. Within the stand pipe 33, I mount a vertically adjustable overflow pipe 34 which discharges into the tank 25 whenever the fat in the kettle 17 is at the same level as its upper extremity thereby providing simple and reliable means for maintaining the fat in the kettle 17 automatically at any desired level. A drainage conduit 35 controlled by the valve 36 connects the kettle 17 to the storage tank 25 to enable the kettle to be drained when desired.

Adjacent the rear or infeed end of the kettle 17 is a hopper 37 disposed to receive raw and suitably prepared products which are discharged therein by the supply conveyor 38 and at the front or outfeed end of the kettle 17 is a conveyor 39 extending upwardly and forwardly from the kettle to carry the properly cooked products out of the kettle 17 for such further operations as may be necessary or desired.

In accordance with my invention, I provide means, indicated generally at 40, to convey products, introduced into the body of hot fat through the hopper 37, under the surface of the hot fat to a point where the cooked products may be picked up and discharged from the kettle 17 by the conveyor 39.

The conveying means 40 shown in the drawings, consists of a perforate cylinder 41 which may conveniently be formed by clamping together, as at 42, semi-cylindrical screen sections of suitable mesh and a perforated helix 43 within said cylinder with its periphery preferably anchored thereto, as at 44 as may be seen in Fig. 7. In practice, the helix 43 terminates a substantial distance from the infeed end of the cylinder 41 into which the discharge end of the hopper 37 extends to establish a chamber 45 which is in the zone of the highest fat temperature. (See Fig. 1.) Preferably, as will be apparent from the drawings, the helix 43 protrudes slightly from the outfeed end of the cylinder 41.

As shown in Fig. 7, I preferably form the helix 43 by welding together the abutting ends of a plurality of like sections. These may be regarded as formed from centrally apertured discs of frusto-conic section so that the helix is inclined forwardly towards its cylinder as suggested in Fig. 8. The thus established helix defines an axial passage 46 which is of utility in ensuring against the overloading of the conveyor means 40 in the cooking of certain products. In cooking other products, I employ the conveyor means shown in Fig. 6 in which the helix 43 is secured to an axial tube 47 which is closed at its ends.

While the conveyor means 40 may be rotated by any suitable means, that shown in the drawings has proved satisfactory. I provide the cylinder 41 with a pair of bands 48 and 49, the adjacent edges of which are flanged as at 50 to retain the cylinder 41 against endwise movement. The bands 48 and 49 engage supporting pairs of rolls 51 and 52 respectively. The rolls 51 are idlers while the rolls 52 are fast on shafts 53 extending through the front end wall of the kettle 17. I have shown each of the shafts 53 as having a chain and sprocket interconnection 54 and one of them is driven through suitable gearing by the motor driven speed reducer unit, indicated generally at 55. Power is also taken from the speed reducer 55 as by the chain 56 to drive the discharge conveyor 39.

With such a drive for the conveyor means 40, it is desirable to ensure against slippage under loads and for that reason, I pivotally connect to the kettle 17 one end of an arm 57 having a pair of idler rolls 58 engageable with the band 49 (see Fig. 2). The other end of the arm 57 is under the influence of the compression spring 59 adjustably tensioned by means of the hand wheel 60 which it backs.

I provide the kettle 17 with a hood 61 hinged as at 62 and having an exhaust port 63 connected to the stack 64 by the slidable sleeve 65 so that by sliding the sleeve 65 upwardly on the stack 64, the port 63 may be disconnected therefrom to enable the hood 61 to be swung into an open position should inspection of the kettle 17 be required or should it be necessary or desirable to remove and replace the conveyor means 40.

Such a hood is necessary to provide means enabling the substantial volume of moisture, driven from the potato particles or other products while they are being cooked in the hot fat, to be removed to prevent it from contaminating the fat. I have found that even with a hood, a substantial volume of condensate is formed when the apparatus is in use and should this flow into the kettle 17 the fat would be contaminated. This is particularly true in the deep fat frying of potato products as the condensate resulting is high in mineral content and is capable of quickly rendering the fat unfit for further use. For that reason, I support a condensate collecting pan 66 in the hood 61 below the exhaust port 63 to receive any condensate forming in the stack 64 and having a drain 67. Gutters 68 and 69 are supported on the inner surfaces of the sides of the hood 61 and these are interconnected at the front end of the hood as at 70 and are so disposed that condensate collected by them flows to the drainage outlet 71.

The operation of apparatus in accordance with my invention and its essential features will be apparent from the illustrative embodiment which I have shown and described.

In practice, suitably prepared products are continuously carried by the conveyor 38 and deposited by it into the hopper 37 which discharges them into the chamber 45 where they become sufficiently dehydrated to float. The conveyor means 40 rotate slowly and the partly dehydrated products float into a position to be positively advanced thereby as suggested in Fig. 9.

As will be apparent from Fig. 8, the helix 43 forces floating particles downwardly and forwardly as it and the cylinder 41 rotate through an arc of substantially 120° when the products are then free to float upwardly until limited by the cylinder 41 and until again engaged by the helix 43 thereby to give them the general course through the hot fat suggested in Fig. 9. While the products are intermittently free of the thrust of the helix 43, their advance is positive since they are at all times contained between its turns until discharged from the conveyor means 40 to be picked up and carried from the kettle 17 by the conveyor 39.

As the products are conveyed under the surface of the hot fat at all times and as their agglomeration is prevented by being intermittently freed from the helix, by the action of their continuing dehydration, and by their contact with the cylinder 41, they may be thoroughly and uniformly cooked in a minimum length of time with a consequential minimum fat absorption. The rate of rotation of the conveyor means 40 may, of course, be varied if desired or necessary by the operator, and as both the cylinder 41 and the helix 43 are perforated, its rotation is without any appreciable fat pumping action.

Contributing to the efficiency of apparatus in accordance with my invention is the fact that the kettle hood 61 minimizes the contamination of the fat by condensate resulting from moisture driven from the products while they cook. Also important is the fact that not only am I able to maintain desired differentials in the fat temperature but also because of the relationship between the kettle 17 and the burners 19, ensure against local spots becoming so hot as to carbonize the fat and break it down.

As a consequence, my invention makes it possible to French fry satisfactory products, efficiently, and economically, and is equally well adapted for treatment of other floating products in liquids.

What I therefore claim and desire to secure by Letters Patent is:

1. Apparatus for use in the continuous production of French fried products, said apparatus comprising a fat containing kettle, and means in said kettle to convey the products from end to end thereof, said conveying means comprising a perforate cylinder rotatably mounted in said kettle below the surface of the hot fat, a helix in and connected to said cylinder and having its blade forwardly and outwardly inclined with respect to the axis of said helix and providing a wall of such dimensions that on rotation of said conveying means, products in the upper part of said cylinder are subjected to a downward and forward thrust, and means to rotate said cylinder at a sufficiently slow rate to enable products that have been pushed forwardly and downwardly to float upwardly out of contact with said helix thereby to effect a positive advancement of the products while preventing their agglomeration.

2. Apparatus for use in the continuous production of French fried products, said apparatus comprising a fat containing kettle, and means in said kettle to convey the products from end to end thereof, said conveying means comprising a perforate cylinder, two pairs of rolls in said kettle rotatably supporting said cylinder below the surface of the hot fat, a helix in said cylinder and connected thereto and having its blade forwardly and outwardly inclined with respect to the axis of said helix and providing a wall of such dimensions that on rotation of said conveying means products in the upper part of said cylinder are subjected to a downward and forward thrust, a pair of oppositely flanged rings on said cylinder axially spaced with each being engaged by a pair of said rolls and means to rotate at least one roll of one pair thereof at a sufficiently slow rate to enable products that have been pushed forwardly and downwardly by the helix to float upwardly out of contact therewith thereby to effect an intermittent positive advancement of the products below the level of the hot fat.

3. The apparatus of claim 2 and means adjustably holding the cylinder under tension against the driving rolls and comprising an arm pivoted at one end to the kettle and extending transversely thereof, a pair of rolls carried by the arm and engageable with one of the rings, a support carried by the kettle adjacent the other end of said arm, and a member threaded through said support and against said arm.

References Cited in the file of this patent

UNITED STATES PATENTS

| Number | Name | Date |
|---|---|---|
| 559,720 | Lacroix | May 5, 1896 |
| 754,278 | Betz et al. | Mar. 8, 1904 |
| 1,732,315 | Ray | Oct. 22, 1929 |
| 2,041,175 | Goodman | May 19, 1936 |
| 2,081,640 | Peterson | May 25, 1937 |
| 2,085,494 | Ferry | June 29, 1937 |
| 2,176,861 | Childs | Oct. 24, 1939 |
| 2,196,353 | Carlo | Apr. 9, 1940 |
| 2,207,316 | Ferry | July 9, 1940 |
| 2,323,154 | Ransohoff | June 29, 1943 |
| 2,359,944 | Schummer | Oct. 10, 1944 |
| 2,425,699 | Kuehn et al. | Aug. 12, 1947 |
| 2,429,360 | Kells | Oct. 21, 1947 |
| 2,439,780 | Napier | Apr. 13, 1948 |
| 2,456,124 | Hoffman | Dec. 14, 1948 |
| 2,517,833 | Bourland | Aug. 8, 1950 |
| 2,543,297 | Olmsted | Feb. 27, 1951 |

FOREIGN PATENTS

| Number | Country | Date |
|---|---|---|
| 221,301 | Switzerland | Apr. 17, 1942 |